United States Patent
Copeland et al.

(10) Patent No.: US 10,942,520 B1
(45) Date of Patent: Mar. 9, 2021

(54) CREATING TRIP ROUTES FOR AUTONOMOUS VEHICLES

(71) Applicant: Wells Fargo Bank, N.A., San Francisco, CA (US)

(72) Inventors: Jennifer L. Copeland, San Francisco, CA (US); Suzanne M. Fisi, Clayton, CA (US); Simone O. Harvey, Berkeley, CA (US); David C. Hatch, Pacifica, CA (US); Chris Kalaboukis, San Jose, CA (US); Muhammed Farukh Munir, Pittsburg, PA (US); Aaron Francis Colfax Petrik, Alameda, CA (US); Darrell L. Suen, San Ramon, CA (US); Timothy R. Ward, Mesa, AZ (US); Steven J. Wirt, Oakland, CA (US); Ryan J. Wyler, Gilbert, AZ (US); Nancy B. Zimmerman, Fairfax, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 421 days.

(21) Appl. No.: 15/492,268

(22) Filed: Apr. 20, 2017

(51) Int. Cl.
*G05D 1/02* (2020.01)
*G05D 1/00* (2006.01)
(Continued)

(52) U.S. Cl.
CPC ......... *G05D 1/0217* (2013.01); *G01C 21/343* (2013.01); *G01C 21/3469* (2013.01); *G01C 21/3605* (2013.01); *G05D 1/0088* (2013.01)

(58) Field of Classification Search
CPC .... G01C 21/3423; G01C 21/00; G01C 21/34; G01C 21/343; G01C 21/3469; G01C 21/3605; G05D 1/0217; G05D 1/0088
(Continued)

(56) References Cited

U.S. PATENT DOCUMENTS 6,085,147 A 7/2000 Myers
7,778,769 B2 8/2010 Boss et al.
(Continued)

FOREIGN PATENT DOCUMENTS

DE 10224467 A1 12/2003
EP 2056235 A1 5/2009
WO 2009156554 A1 12/2009

OTHER PUBLICATIONS

Tully, Jim et al., "Internet of Things Primer for 2016," Mar. 31, 2016, 8 pages.
(Continued)

*Primary Examiner* — Isaac G Smith
(74) *Attorney, Agent, or Firm* — Merchant & Gould P.C.

(57) ABSTRACT

A method for using an autonomous vehicle includes receiving one or more user preferences for use of the autonomous vehicle. A destination is received for a trip using the autonomous vehicle. An arrival time is received for when the trip needs to be completed. A determination is made as to whether the user preferences includes a preference for physical activity for the trip. One or more routes are provided for the trip to the destination that permits the trip to be completed by the arrival time and that implements at least one of the user preferences. At least one of the routes comprises a hybrid route including one segment in which a physical activity selected by the user is suggested for traversing a distance of the one segment and another segment using the autonomous vehicle.

15 Claims, 8 Drawing Sheets

(51) Int. Cl.
  *G01C 21/34* (2006.01)
  *G01C 21/36* (2006.01)
(58) Field of Classification Search
  USPC .................................................. 701/23, 25
  See application file for complete search history.

(56) References Cited

U.S. PATENT DOCUMENTS

| | | | |
|---|---|---|---|
| 8,108,141 | B2 | 1/2012 | Ehrlacher |
| 8,504,284 | B2 | 8/2013 | Brulle-Drews et al. |
| 8,706,394 | B2 | 4/2014 | Trepagnier et al. |
| 8,949,028 | B1* | 2/2015 | Klampfl ............ G01C 21/3423 701/527 |
| 9,389,086 | B2 | 7/2016 | Hashem et al. |
| 2008/0133120 | A1 | 6/2008 | Romanick |
| 2008/0243663 | A1 | 10/2008 | Eveland |
| 2009/0005963 | A1* | 1/2009 | Jarvinen .......... G08G 1/096883 701/533 |
| 2009/0119001 | A1 | 5/2009 | Moussaeiff et al. |
| 2011/0184642 | A1 | 7/2011 | Rotz et al. |
| 2015/0081210 | A1* | 3/2015 | Yeh ......................... G06F 16/60 701/428 |
| 2015/0095197 | A1 | 4/2015 | Eramian |
| 2015/0226563 | A1 | 8/2015 | Cox et al. |
| 2015/0323330 | A1* | 11/2015 | Lord .................... G06Q 10/025 701/410 |
| 2015/0345967 | A1 | 12/2015 | Meuleau |
| 2015/0346718 | A1 | 12/2015 | Stenneth |
| 2016/0016525 | A1 | 1/2016 | Chauncey et al. |
| 2016/0075333 | A1 | 3/2016 | Sujan et al. |
| 2016/0298974 | A1 | 10/2016 | Newlin et al. |
| 2016/0298977 | A1 | 10/2016 | Newlin et al. |
| 2017/0191843 | A1* | 7/2017 | Yadav ................. G01C 21/3461 |
| 2018/0060988 | A1* | 3/2018 | Klenk ..................... G06Q 50/30 |
| 2018/0156623 | A1* | 6/2018 | West .................. G01C 21/3423 |
| 2018/0231386 | A1* | 8/2018 | Bellotti ................... G01C 21/20 |

OTHER PUBLICATIONS

Velosa, Alfonso, et al., "Hype Cycle for the Internet of Things, 2016," Jul. 14, 2016, 68 pages.
Velosa, Alfonso et al., "Maturity Model for the Internet of Things," Mar. 2, 2016, 18 pages.
Tully, Jim, "IoT: Key Lessons to Date and Action Plan for 2016," Feb. 12, 2016, 8 pages.
Prentice, Stephen, "The Six Forces That Will Shape Business and Technology in 2030," Feb. 1, 2016, 9 pages.
Friedman, Ted et al., "Predicts 2016: Unexpected Implications Arising From the Internet of Things," Dec. 3, 2015, 13 pages.
Cearley, David W. et al., "Top 10 Strategic Technology Trends for 2016," Feb. 29, 2016, 15 pages.
Burke, Brian et al., "Top 10 Strategic Technology Trends for 2016: Internet of Things Architecture and Platforms," Feb. 19, 2016, 11 pages.
Cearley, David W. et al, "Top 10 Strategic Technology Trends for 2016: Ambient User Experience," Feb. 26, 2016, 11 pages.
Walker, Mike J. et al., "Top 10 Strategic Technology Trends for 2016: Information of Everything," Feb. 26, 2016, 11 pages.
Plummer, Daryl C. et al., "Top Strategic Predictions for 2016 and Beyond: The Future Is a Digital Thing," Oct. 2, 2015, 27 pages.
Jones, Nick, "Top 10 IoT Technologies for 2017 and 2018," Jan. 22, 2016, 12 pages.
Geschickter, Chet et al., "Measuring the Strategic Value of the Internet of Things for Industries," Apr. 28, 2016, 14 pages.
Furlonger, David et al., "Toolkit: IoT Strategic Technology Map for Financial Services Initiatives," Dec. 2, 2015, 4 pages.
Furlonger, David et al., "Survey Analysis: Financial Services CIOs Should Not Ignore the Internet of Things," Mar. 17, 2015, 17 pages.
Moyer, Kristin R. et al., "Measuring the Strategic Value of Financial Services IoT," Dec. 2, 2015, 10 pages.
Newton, Alistair et al., "Gartner's Digital Banking Customer Advisory Framework," Jul. 7, 2016, 8 pages.
Moyer, Kristin R., "Industry Vision: Banks as Platforms," Apr. 22, 2016, 11 pages.
Moyer, Kristin R. et al., "Industry Vision: Tipping Point for Banks as Platforms," May 3, 2016, 11 pages.
Moyer, Kristin R., "The Economics of Connections for Banking," Mar. 8, 2016, 12 pages.
Geschickter, Chet et al., "Survey Analysis: Early Adopters of Internet of Things Poised to Make 2016 the Year of the Customer," Feb. 12, 2016, 15 pages.
Lehong, Hung et al., "Building a Digital Business Technology Platform," Jun. 8, 2016, 21 pages.
"What is the full cost of your commute?," http://movingforward.discoursemedia.org/costofcommute/, Mar. 26, 2015, 11 pages.
"Your Cost to Drive Is Higher Than You Think," http://www.forbes.com/sites/tombarlow/2011/04/25/your-cost-to-drive-is-higher-than-you-think/#3c6d07ac22c3;, Apr. 25, 2011, 4 pages.
"Underestimated: The True Cost of Driving Your Car," http://simpleeconomist.com/underestimated-the-true-cost-of-driving-your-car/, Mar. 5, 2013, 5 pages.
"Route Planning for Your Business," https://www.route4me.com/, Oct. 13, 2016, 22 pages.

* cited by examiner

User Preferences

300

- 302 ☐ Low cost
- 304 ☐ Low stress
- 306 ☐ Fast route
- 308 ☐ Scenic route
- 310 ☐ Safe route
- 312 ☐ Hybrid trip
- 314 ☐ Ride sharing
- 316 ☐ Good quality roads
- 318 ☐ Cheap parking
- 320 ☐ Parking close to destination
- 322 ☐ Minimize AV emissions
- 324 ☐ Permit gamification
- 326 ☐ Micro-insurance
- 328 ☐ Rent AV
- 330 ☐ Own AV
- 332 ☐ Permit multiple use

Route A - 702
☐ 704

AV -> I-94 to John Ireland Blvd
John Ireland Blvd to State Capitol   16 min.

■ 718 Time
☐ 720 Cost
☐ 722 Health
☐ 724 Environment

Route B - 704
☐ 708

Walk -> U.S. Bank Stadium   0.8 miles, 16 min.
AV -> I-94 to John Ireland Blvd   15 min
John Ireland Blvd to State Capitol   31 min.

☐ 726 Time
☐ 728 Cost
■ 730 Health
☐ 732 Environment

Route C - 710
☐ 712

AV -> I-94 to Snelling Ave.
Snelling Ave. to Summit Ave.   12 min.
Bike -> Summit Ave. to John Ireland Blvd   3.7 miles, 25 min.
John Ireland Blvd to State Capitol   37 min.

☐ 734 Time
■ 736 Cost
■ 738 Health
■ 740 Environment

Route D - 714
☐ 716

Light Rail -> Lexington Parkway and University Ave   30 min.
Walk -> University Ave to State Capitol   8 miles, 40 min.
                                          1 hour, 10 min.

☐ 742 Time
■ 744 Cost
■ 746 Health
■ 748 Environment

FIG. 7

CREATING TRIP ROUTES FOR AUTONOMOUS VEHICLES

BACKGROUND

An autonomous vehicle is a self-driving vehicle that can operate with little or no human control of the vehicle. A variety of techniques can be used to detect the surroundings of and navigate the autonomous vehicle. Techniques used to detect the surroundings of the autonomous vehicle can include radar, global positioning system (GPS) and computer vision. Advanced control systems can be used to interpret sensory data and to help navigate the autonomous vehicle.

Autonomous vehicles are being developed and typically require a driver in the vehicle that can immediately take control of the vehicle in an emergency. However, in the future, an expectation is that fully autonomous vehicles will become available. When fully autonomous vehicles become available, humans in the vehicle can be freed up to perform other tasks besides driving.

SUMMARY

Embodiments of the disclosure are directed to a method implemented on an electronic computing device for using an autonomous vehicle, the method comprising: on the electronic computing device, receiving one or more user preferences for use of the autonomous vehicle; receiving a destination for a trip using the autonomous vehicle; receiving an arrival time for when the trip needs to be completed; determining whether the user preferences includes a preference for physical activity for the trip; and providing one or more routes for the trip to the destination that permits the trip to completed by the arrival time and that implements at least one of the user preferences, at least one of the routes comprising a hybrid route including one segment in which a physical activity selected by the user is suggested for traversing a distance of the one segment and another segment using the autonomous vehicle.

In another aspect, a method for using an autonomous vehicle comprises: on the electronic computing device, receiving a profile of a user of the autonomous vehicle; receiving a destination for a trip using the autonomous vehicle; receiving an arrival time for when the trip needs to be completed; calculating an estimated time of completion of a first segment of the trip, the first segment of the trip being traversed by the user using a selected physical activity of the user; calculating an estimated time of completion of a second segment of the trip using the autonomous vehicle; using the estimated time of completion of the first segment of the trip and estimated time of completion of the second segment of the trip to calculate a starting time for the trip to permit the user to complete the trip by the arrival time; determining from a personal calendar of the user whether the user is able to start the trip at the starting time; and when a determination is made that the user is able to start the trip at the starting time, determine provide a route for the trip that includes the first segment of the trip and the second segment of the trip.

In yet another aspect, an electronic computing device comprises: a processing unit; and system memory, the system memory including instructions which, when executed by the processing unit, cause the electronic computing device to: receive a profile of a user of an autonomous vehicle; receive a destination for a trip using the autonomous vehicle; receive an arrival time for when the trip needs to be completed; using the profile of the user, determine a first route for the trip that permits the trip to completed by the arrival time and that implements a user preference for a trip that includes one segment in which a physical activity selected by the user is suggested for traversing a distance of the one segment and another segment in which the autonomous vehicle is used; using the profile of the user, determine a second route for the trip that permits the trip to be completed by the arrival time and that includes one segment in which a method of public transportation is used and another segment in which the autonomous vehicle is used; and using the profile of the user, determine a third route for the trip that permits the trip to be completed by the arrival time and that minimizes a cost for the trip.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for creating travel routes to be used by an autonomous vehicle and for determining a total cost of operating the autonomous vehicle. The travel routes can be created based on user preferences and can include hybrid routes that can comprise a combination of a physical activity of a user and a route taken by the autonomous vehicle. The total cost of operating the autonomous vehicle can take into consideration factors such as financial costs, costs associated with environmental factors and costs associated with health factors.

The autonomous vehicle (AV) is a self-driving vehicle that can be owned or rented by the user. In this disclosure, the user is a customer of an organization that can provide trip routes to the customer using the AV, based on customer preferences and other information regarding the customer. Other information regarding the customer can include information from a personal calendar of the customer and from profile of the customer, including such information as the customer's home address, employer and work address.

Examples of organizations that can provide trip routes to the customer can include Google and Apple, which can provide services such as Google Maps and Apple Maps, respectively. In example implementations, the organizations can receive additional information regarding the customer from third party sources, such as a financial institution where the customer can have a financial account, from car rental companies that can rent an AV to the customer and from other sources. The organizations can provide trip route applications to the customers that can use the customer preferences and the customer information from the third party sources to provide alternate trip routes to the customer, as explained in more detail later herein.

The user can establish preferences for using the AV at a website of the organization or a website of one of the third party sources. Some example user preferences can be for a route that can result in a minimal cost of operating the AV, a route that when possible, combines physical activity on the part of the user with driving in the AV, a route that minimizes stress for the user, such as a route with less traffic, a route that includes a scenic part and a route that can be beneficial for the environment, such as one that minimizes the use of gasoline. Other user preferences are possible. Some of the user preferences can be combined.

In an example implementation, the user can select multiple preferences and a software application on a server computer of the organization can recommend one or more routes based on the multiple preferences and based on user requirements for the trip using the AV. Example preferences can include cheap parking, carpooling, reduce stress, fastest time to destination, minimize cost of trip, combine physical activity, park close to destination, scenic route, minimize AV emissions, clear air, combine tasks, micro-insurance per ride, good quality roads, safe (low-crime) route and gamification. These preferences are explained in more detail later herein. Example user requirements can include a trip destination, a needed arrival time at the destination and a starting location for the trip.

Some of the multiple preferences may be incompatible. For example, a preference for a fast time to destination may be incompatible with preference for combining physical activity with the ride in the AV or with the preferences of taking a scenic route. The server computer can determine a priority ranking for the preferences based on a user profile and based on the user requirements for the trip. For example, when the user requirements indicate that the user needs to reach a specific destination by a specific time and the user also wants to combine physical activity with the ride in the AV, the server computer can propose one route using just the AV that suggests a starting time and starting location, for example the user's home, that can permit the user to get to the specific destination at the specific time. However, when the user's personal calendar indicates that the user does not have time for physical activity, the server computer can propose a route that gets the user to the destination in the fastest time.

The server computer can also propose an alternate route that can combine a physical activity such as walking, running, biking or skating from the same starting location, but that can require the user to access the AV at a different location and that can require the user to start earlier. The server computer can also propose other alternate routes can combine other user preferences, such as a scenic route, a safe route and less stress, but that can result in a different starting time and a different location from which to pick up the AV.

In addition to providing one or more routes for a trip using the AV, the server computing can also include cost information associated with each route. Some cost information can include monetary costs, such as a cost of gasoline for the trip, a cost associated with depreciation of the AV during the trip and a cost for car insurance during the trip.

Other costs can also be included, such as a health cost and an environment cost. The health cost can comprise a number that includes a projected stress level for the trip, a degree of exercise built into the trip and a cost associated with breathing in clean or polluted air during the trip. The environmental cost can include a cost associated with an amount of air pollution the AV generates during the trip, a cost associated with impact of the AV on roads used during the trip and a cost associated with a degree to which the AV contributes to traffic congestion during the trip. In an example, the health cost and environmental cost can each be represented by a scaled number, for example from 1 to 10, where 10 can represent a high cost and 1 can represent a low cost. Other ways to represent the health cost and the environmental cost are possible.

The user of the AV can also permit activities using the AV that may not be possible using a standard vehicle. For example, with an AV, the user does not need to concentrate on driving. Therefore, the user can perform other activities in the AV during the trip. Some example activities can include reading, watching television, doing work tasks, participating in a meeting, such as a video conference in the AV and participating in marketing or other surveys. In addition, the AV may be able to take the user directly to the desired destination and then park itself. The AV may also be able to multiple tasks for the user, such as directing the AV to a dry cleaner so the user can drop off dry cleaning before continuing onto the desired destination. In addition, if the user owns the AV, the user may be able to rent out the AV while the user is at work or otherwise not using the AV.

The AV can also interact with the user's personal schedule, personal profile and trip preferences to schedule, reserve and pay for relevant services along a trip route. For example, based on the user's personal schedule, profile and trip preferences the AV can determine that to reach a trip destination, the user wants to 1) ride in the AV for a segment of the trip, 2) stop for coffee during the segment, 3) take a yoga class at the end of the segment and 4) ride a bike share bicycle for a remaining segment of the trip. For this example, the AV could access a coffee shop application on the user's smartphone, pre-order and pay for a coffee drink for the user, access a yoga studio application on the user's smartphone to reverse a spot in the yoga class, locate a bike share pickup location closest to a yoga studio at which the yoga class is being held, reserve a bike and provide directions from the yoga studio to the bike share pickup location.

Gamification can also be used to permit the user to earn reward points that can be used to offset a part of the trip. For example, the user may be able to earn reward points by participating in a marketing survey during the trip. As another example the user may be able to earn reward points that may help reduce health insurance premiums for the user by combining physical activity with trips using the AV.

The systems and methods disclosed herein are directed to a computer technology that can automatically create trip routes using an autonomous vehicle. Multiple trip routes can be created to satisfy multiple user preferences, including hybrid routes that can maximize both finance and heath. The systems and methods can also show a true cost of a trip that can include financial factors such as fuel efficiency, maintenance and insurance, and can also include health and environmental costs.

Figure 1:
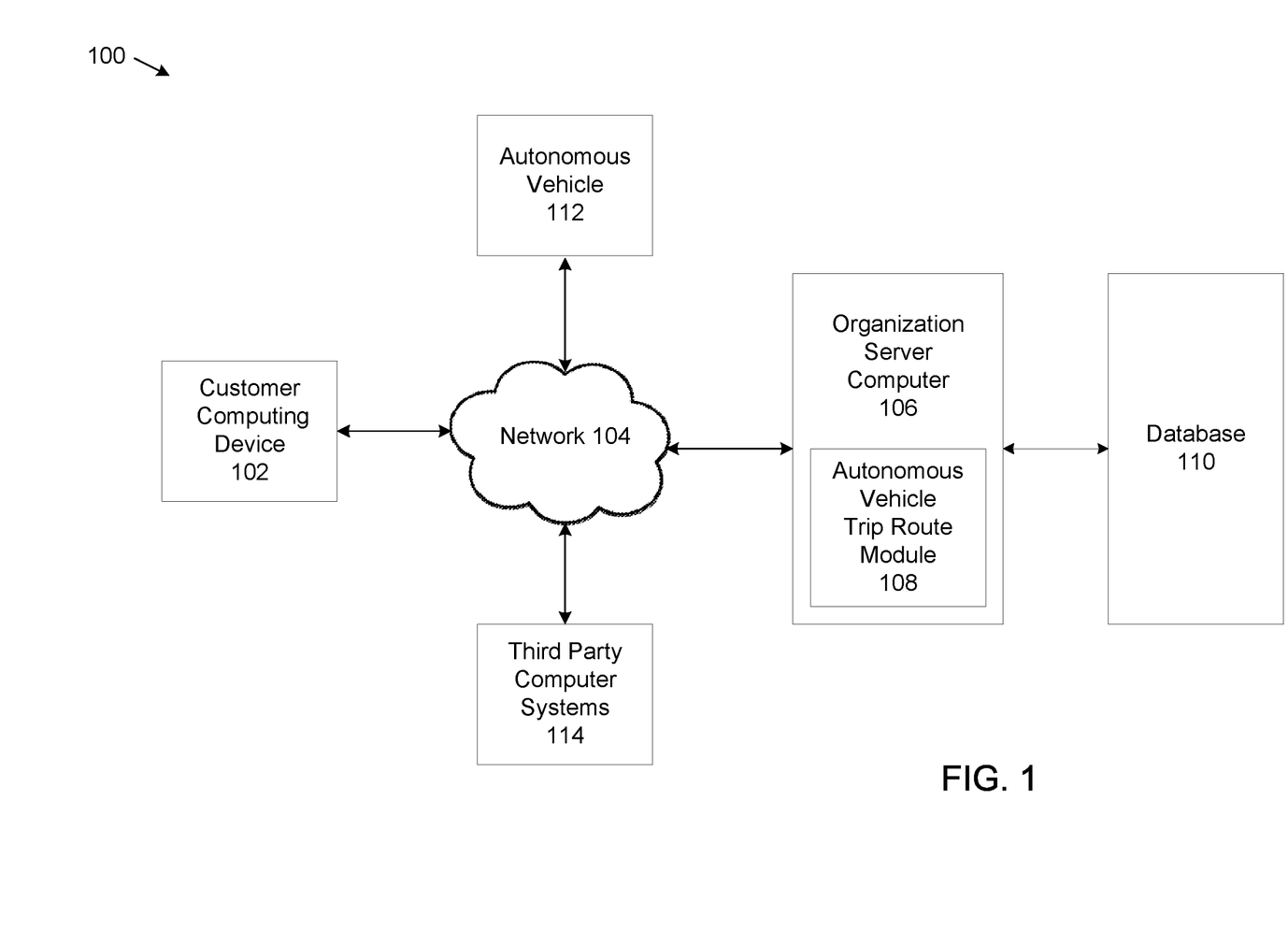
FIG. 1 shows an example system that supports creating trip routes for autonomous vehicles.

FIG. 1 shows an example system 100 that can support creating trip routes for autonomous vehicles. System 100 includes a customer computing device 102, a network 104, an organization server computer 106, a database 110, an autonomous vehicle 112 and third party computer systems 114. Organization server computer 106 includes an autonomous vehicle trip route module 108. More, fewer or different modules are possible.

The example customer computing device 102 is an electronic computing device of a user who is a customer of an organization associated with organization server computer 106. The electronic computing device can be a desktop computer, a laptop computer, a smartphone or a tablet computer. More than one customer computing device 102 can be used.

The example network 104 is a computer network such as the Internet. Customer computing device 102 can wirelessly connect to or otherwise access organization server computer 106 via network 104.

The example organization server computer 106 is a server computer of an organization that can provide trip routes to the user. Examples of such organizations can include Google and Apple. Other organizations are possible.

The organization can obtain profile information regarding the customer and the customer's family from one or more third party organizations. In addition, some or all of the profile information can be directly obtained from the user and stored in organization server computer 106. The profile information can include such items such as name, address, contract information, employer, salary, mortgage information and payment card information. Other profile information is possible. More than one organization server computer 106 is possible.

The example AV trip route module 108 stores information regarding user preferences for the AV. The AV trip route module 108 also stores information regarding costs associated with trip routes, including financial costs, environmental costs and health costs. In addition, the AV trip route module 108 includes gamification and marketing information regarding trip routes. Other information regarding the AV trip route module 108 is possible. In some implements some of the information stored by AV trip module 108 can be stored in one or more of the third party computer systems 114.

The example database 110 is a database associated with the financial organization. Financial and other information regarding the customer can be stored in database 110. In addition, trip route information for the customer can also be stored in database 110. More than one database 110 is possible.

The example autonomous vehicle 112 is a self-driving vehicle that can be owned by or rented by the user. Autonomous vehicle 112 includes electronics that permits communication between autonomous vehicle 112 and organization server computer 106 over network 104.

The example third party computer systems 114 are computer systems of third party organization that can provide personal information about the customer to autonomous vehicle trip route module 108. An example third party computer system 114 is a server computer of a financial institution, such as a bank, at which the user can have one or more financial accounts. The financial institution can include a profile of the user that can include such items as name, age, address, employer, employer's address, spouse, names and ages of children and other information related to trips using the AV. Examples of the other information related to trips using the AV can include average user speeds for activities such as walking, running, biking and skating. Other information can be provided by one or more of the third party computer systems 114.

Figure 2:
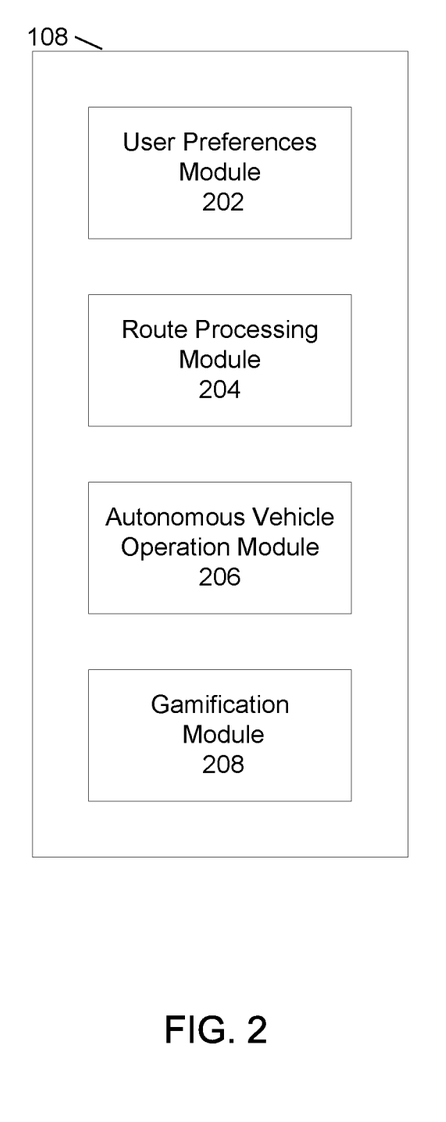
FIG. 2 show example modules of the autonomous vehicle trip route module of FIG. 1.

FIG. 2 shows example modules of AV trip route module 108. The example modules include a user preferences module 202, a route processing module 204, an autonomous vehicle operation module 206 and a gamification module 208. More, fewer or different modules are possible.

The example user preferences module 202 permits the user to select preferences for use of the AV. The user can select the preferences when logging onto financial application server 106 via customer computing device 102. Some example user preferences for a trip using an AV can be lost cost, low stress, fast route, scenic route, safe route, hybrid trip, ride sharing, good quality roads, cheap parking, parking close of destination, minimize AV emissions, permit gamification, micro-insurance, rent AV, own AV and permit multiple use. These user preferences are discussed in greater detail later herein in reference to FIG. 3. Other user preferences are possible.

The example route processing module 204 uses the user preferences and specific trip information to create one or more routes for the specific trip using the AV. The specific trip information can be entered via a software application of customer computing device 102, for example on a smartphone of the user. The specific trip information can include such items as a destination location, a needed arrival time, a pickup location and, if a hybrid trip is selected, a selection of a physical activity such as walking, running, biking or skating.

The route processing module 204 uses a software algorithm that can create one or more trip routes based on priorities using the user preference. Because some user preferences can be mutually exclusive, for example a fast route and a hybrid route or a scenic route, some user preferences can take priority over others. For the software algorithm, the fast route can take a highest priority—for example when the user needs to be at a destination by a specific time. Other user preferences that can take priority can include a safe route and a low cost route.

As an example, when the user selects priorities of a fast route and a hybrid route, the route processing module 204 can create two alternate routes. The user selection of both the fast route and the hybrid route indicates to the route processing module 204 that the user has enough time to include physical activity in the trip. For the fast route, the route processing module 204 can create a route that uses the AV to drive the user from the pickup location to the destination location along the most direct and fastest route from the pickup location to the destination location, taking into consideration current traffic conditions.

For the hybrid route, the route processing module can create a route that combines a selected physical activity with the AV to permit the user to reach the destination by the specific time. However, because the physical activity increases the total time for the trip, the route processing module 204 calculates a time duration for the physical activity and calculates an earlier pickup time for the user. The user can then select which of the two routes to take. The route processing module 204, can display the alternate route information on a smartphone or other electronic device of the user.

The route processing module 204 can also calculate and display a cost for each created route. The cost for each route can include a monetary cost and a non-monetary cost. The monetary cost can include a cost of gasoline, tolls and parking for the trip and any costs for renting the AV for the trip. The monetary cost can also include a projected cost of depreciation for the AV. The non-monetary costs can include health costs, social costs and environmental costs. Health costs can indicate a cost to the user due to the stress of the trip. The health costs can be reduced when physical activity is included in the trip. The social costs can include a cost due to depreciation of the roads and streets used during the trip and a cost due to traffic congestion during the trip. The environmental costs can include air pollution generated by the trip and noise pollution caused by the trip.

In some implementations, the non-monetary costs can comprise a number representing a range of the non-monetary cost. For example, using a scale of 1 to 10, a non-monetary cost of 10 can represent a very high cost. In other implementations, the non-monetary costs can be projected into an estimated monetary cost, for example an estimated monetary cost of repairing roads and streets due to depreciation.

The example autonomous vehicle operation module 206 processes information related to the operation of the AV. Example operations can include determining availability of AVs to meet trip requests, programming an AV to travel to a specific pickup location at a specific time, programing an AV to travel on a selected route to a selected destination and programming an AV to either return to a central location or to park at a location near the selected destination after dropping the user off at the destination. Other operations are possible based on user preferences for the trip. For example, based on user preferences, the AV can be programmed to perform one or more tasks for the user, being directed to a dry cleaner so that the user can pick up his/her dry-cleaning after work before driving the user home. In some implementations, the autonomous vehicle operation module 206 may be included on a third party computer system 114, for example, on a computer system of a car rental company, instead of on organization server computer 106.

The example gamification module 208 can provide tasks for the user to perform for rewards points, based on user preferences, when the user is riding in the AV. One example task can be for the user to complete an online marketing survey while riding in the AV, for which the user can earn rewards points. Another example task can be for the user to take an environmentally friendly route using the AV two times a week. An environmentally friendly route can be a route that is not heavily trafficked and that uses less travelled roads. Another example task is for the user to take hybrid trips that include physical activity three times a week. For example, the user can do running on Monday, walking on Wednesday and biking on Friday. Different activities and a different number of days can be used. The user can earn reward points for completing each activity and can earn bonus rewards points for completing all activities. Other gamification tasks can be used. In some implementations, the gamification module 208 may be included on a third party computer system 114, for example, on a computer system of a financial institution, instead of on organization server computer 106.

Figure 3:
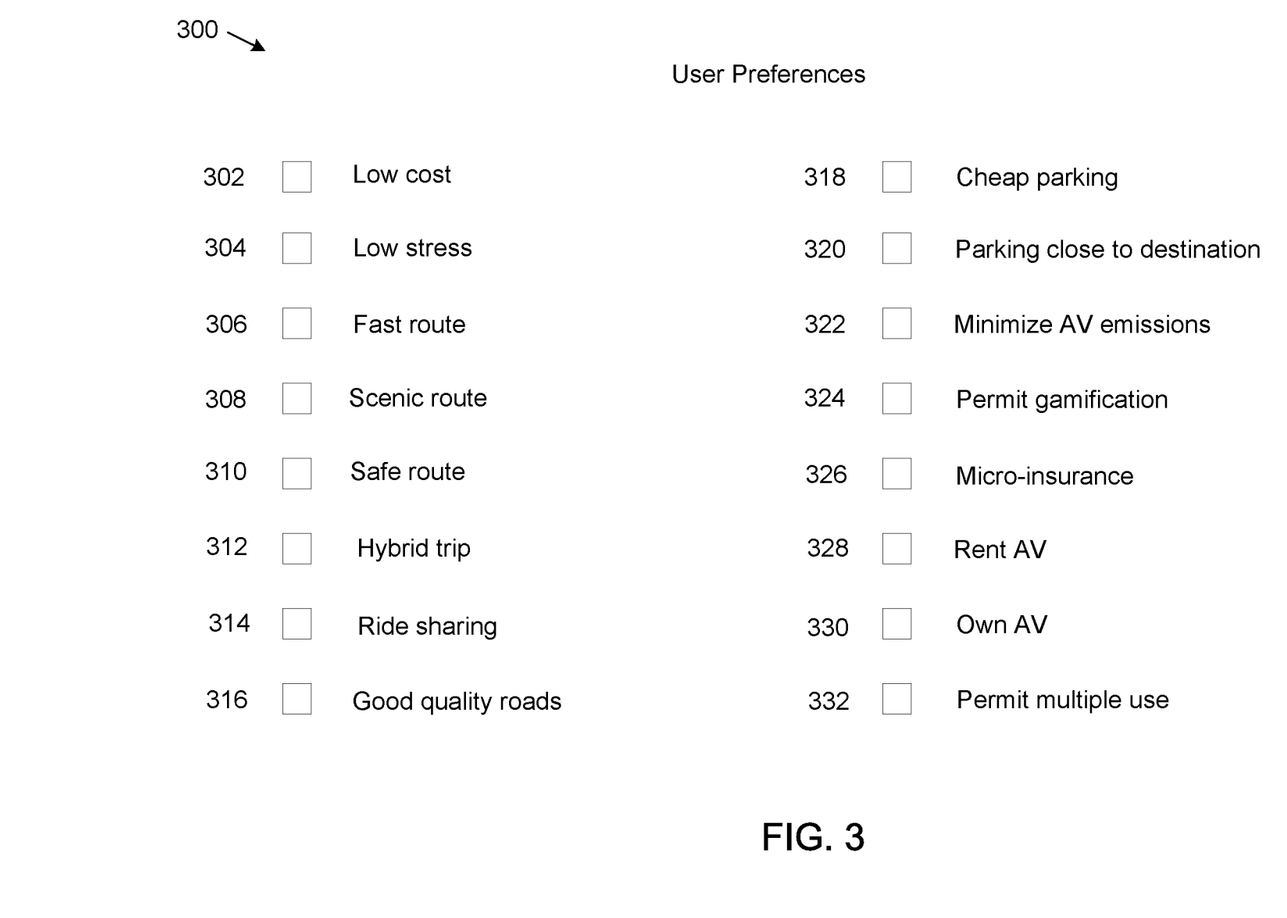
FIG. 3 shows an example user interface for entering trip route preferences.

FIG. 3 shows an example user interface 300 from which the user can enter preferences for use of the AV. For the example user interface 300, each preference has checkbox associated with it and the user can select a preference by checking an associated checkbox. As shown on user interface 300, example preferences can include low cost 302, low stress 304, fast route 306, scenic route 308, safe route 310, hybrid trip 312, ride sharing 314, good quality roads 316, cheap parking 318, parking close to destination 320, minimize AV emissions 322, permit gamification 324, microinsurance 326, rent AV 328, own AV 330 and permit multiple use 332.

The low cost 302 preference indicates a user preference for a route that can minimize costs such as gasoline, tolls and parking fees.

The low stress 304 indicates a user preference for a route that can minimize user stress, such as route where the traffic flows and that minimizes stop and go driving and a safe route that does not require the user to navigate unsafe streets.

The fast route 306 preference indicates a user preference for a route that can get the user to the destination in the fastest time.

The scenic route 308 preference indicates a user preference for a relaxing route through pleasant scenery. In an urban area, this can be a route through a residential neighborhood instead of on a highway or a route that bypasses areas such as manufacturing plants or oil refineries.

The safe route 310 user preference indicates a user preference for an area that is relatively free from crime.

The hybrid trip 312 user preference indicates a user preference for a route that can combine physical activity on the part of the user with a ride in the AV. When the safe route 310 user preference is combined with the hybrid trip 312 user preference, the route processing module 204 can make sure that a physical activity such as walking, running, biking or skating is routed through a safe area.

The ride sharing 314 user preference indicates a user preference for ride sharing. By using ride sharing, the user can share a cost of using the AV with others. When the ride sharing 314 user preference is selected, the route processing module 204 can attempt to obtain information about other user's associated with the organization than may be able to combine rides with the user. In some implementations, the user can provide a list of potential ride sharers to organization server computer 106. For example, the user can provide a list of co-workers that leave near to user that may want to ride share to work with the user.

The good quality roads 316 user preference indicates a user preference for roads that are in good condition. Good quality roads can result in a less stressful trip for the user and can also minimize repair costs and depreciation of the AV.

The cheap parking 318 user preference indicates a user preference for cheap parking of the AV. For a situation where the user owns the AV or rents the AV but needs to stay at a specific destination for a period of time, the AV can attempt to find a parking location with a low parking fee. Because the AV can park itself, the AV can find a parking location that may be beyond a reasonable walking distance from the specific destination but that is less expensive than a closer location. In another situation, the user may want the AV parked closed to the specific destination because the user may need to access the AV quickly. For this situation, the user may not select the cheap parking 318 user preference.

The parking close to destination 320 user preference indicates a user preference for parking relatively close to the drop-off destination. The user may want to select the parking close to destination 320 option when the user is in a hurry and may need quick access to the AV. However, because parking close to the drop-off destination may be more expensive than parking farther away, when both the cheap parking 318 and parking close to destination 320 user preferences are selected, the parking close to destination 320 user preference can have a higher priority.

The minimize AV emissions 322 user preference indicates a user preference for a trip route that can minimize polluting emissions from the AV. Typically, a route that can minimize AV emissions is less trafficked route in which the AV can move at a steady speed and for which stop and go driving is minimized.

The permit gamification 324 user preference indicates a user preference for gamification of the part of the user. With gamification that user can perform activities while riding in the AV, such as marketing surveys, that can result in reward points or monetary awards for the user.

The micro-insurance 326 user preference indicates a user preference for micro-insurance when using the AV. Micro-insurance permits each ride or rides within a specific time frame to be insured separately. When the user rents the AV, the AV rental company can charge the user micro-insurance based on each rental of the AV. When the user owns the AV, but does not use the AV enough to justify conventional insurance, for example for a six-month period, the user may prefer to use micro-insurance for a specific period of time.

The rent AV 328 user preference indicates a user preference for renting an AV. The own AV 330 user preference indicates that the user owns the AV. The user preference for rent AV 328 and own AV 330 can determine other user preferences and can influence how the route processing module 204 creates routes for the AV. For example, a user who rents an AV may be less concerned about using good quality roads and may not need to park the AV after being dropped off at the specific destination.

The permit multiple use 332 user preference indicates a user preference for using the AV for activities other than driving the user from a starting destination to a drop-off destination. For example, when the user owns the AV, the user can rent out the AV to others after being dropped off. As another example, the user can direct the AV to perform tasks for the user, such as directing the AV to a retail location on the way to work or returning from work so that the user can pick up the user's dry cleaning or directing the AV to a coffee shop and driving around the block while the user stops at the coffee shop for coffee. Other multiple uses are possible.

Figure 4:
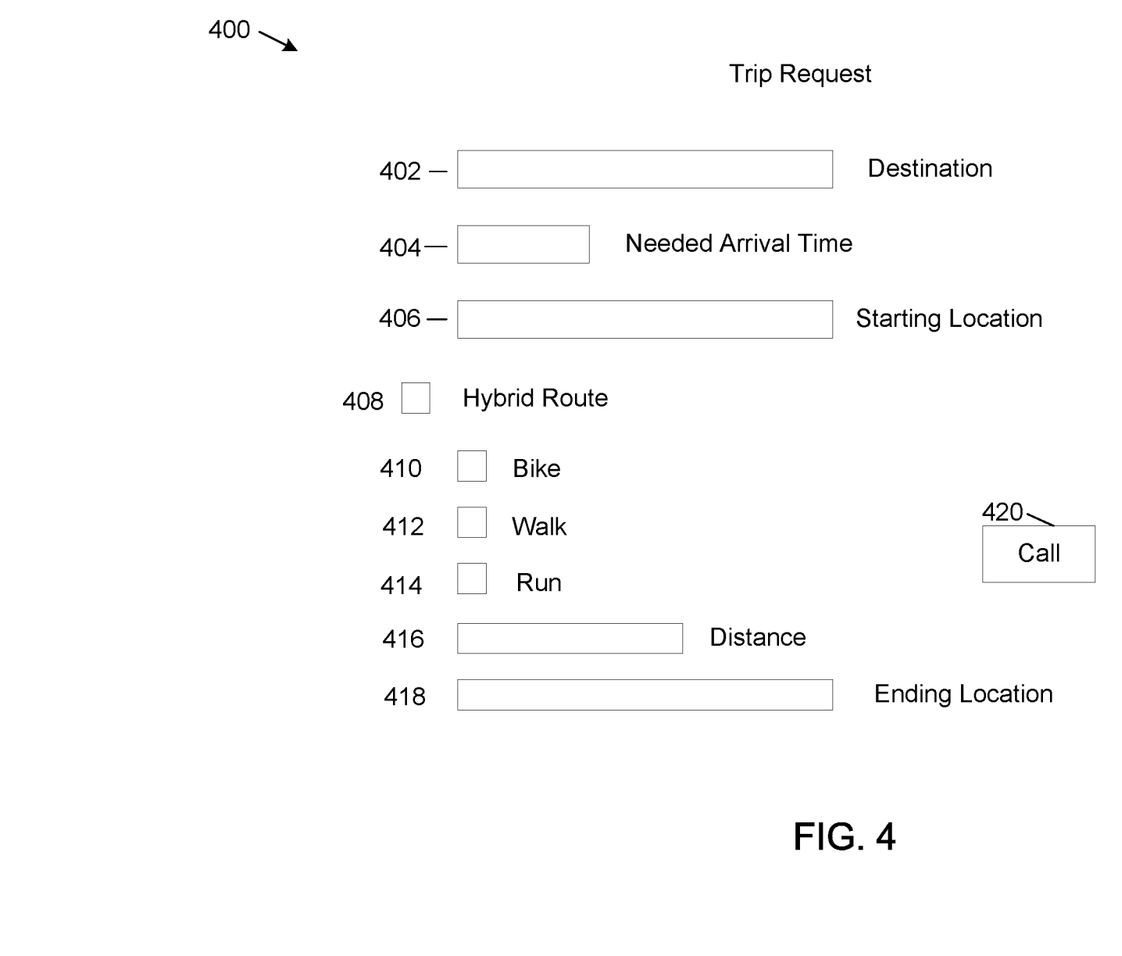
FIG. 4 shows an example user interface for a trip request.

FIG. 4 shows an example user interface 400 for a trip request. The user interface 400 can be displayed on customer computing device 102 of the user when the user arranges a specific trip using the AV. In an example implementation, user interface 400 can be displayed on the user's smartphone using a software application from the organization that can provide the AV to the user. The user can specify parameters of the specific trip using user interface 400 and can also initiate a call for the AV.

User interface 400 permits entry of a destination 402 for the trip, a needed arrival time 404, a starting location 406, a checkbox for a hybrid route 408 and checkboxes 410-414 for specific physical activities that can be used during the hybrid route. The user can enter the destination for the trip in edit box 402, the needed arrival time in edit box 404 and the starting location for the trip in edit box 406. The specific physical activities for the hybrid trip can include biking, walking and running. When the hybrid route 408 is selected, the user can also enter a distance for the physical activity in edit box 416 or an ending location for the physical activity in edit box 418. The ending location for the physical activity can also be specify a location at which the AV can meet the user to start an AV portion of the trip.

When all the parameters of the trip are set up, the user can initiate the trip and place a call for the AV via the example call 420 button. When the user selects the call 420 button, the parameters of the trip can be sent to organization server computer 106 and the autonomous vehicle trip route module 108 can arrange for an AV to meet the user at a location indicated by the parameters. For example, when a non-hybrid trip is selected, the AV can meet the user at starting location 406. However, when a hybrid trip is selected, the AV can meet the user at the ending location of the physical activity, as specified in ending location 418.

Figure 5:
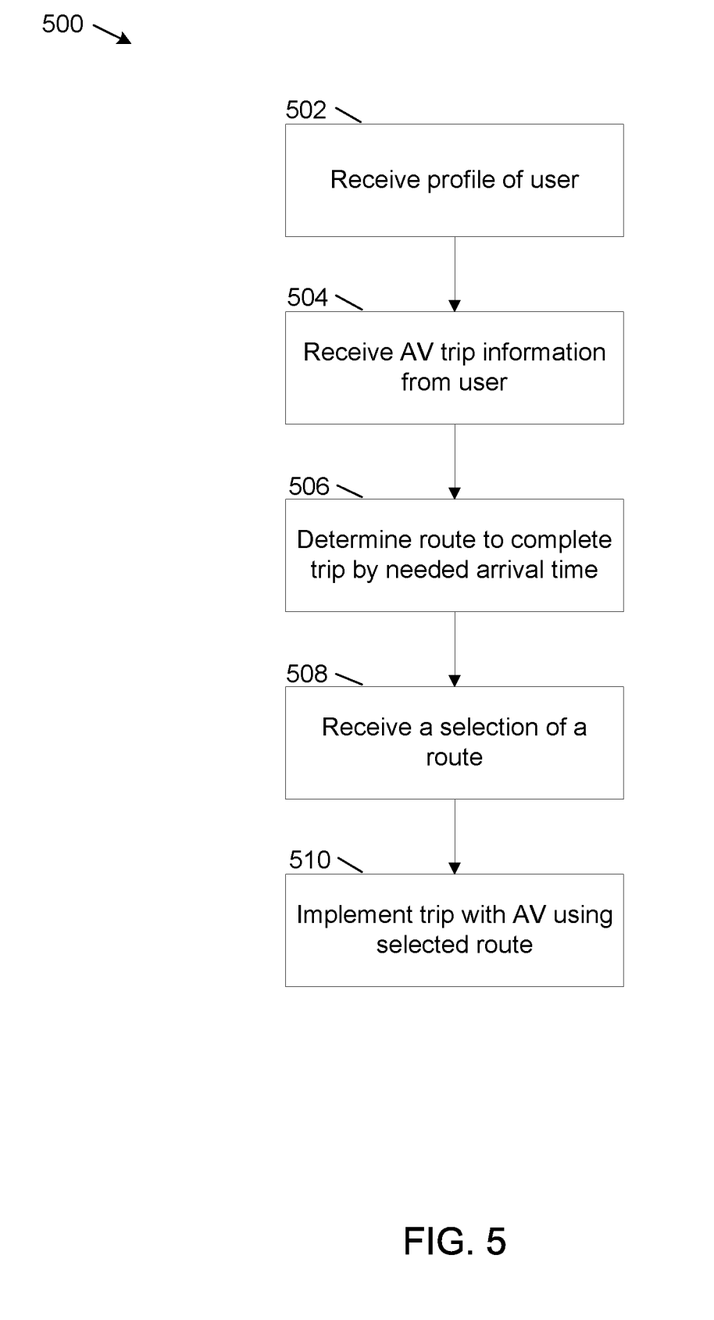
FIG. 5 shows an example method for implementing a trip using an autonomous vehicle.

FIG. 5 shows a flowchart for an example method 500 for implementing a trip using the AV. In an example implementation for method 500, a user is a customer of an organization associated with the organization server computer 106 and the organization rents autonomous vehicles to customers of the organization.

At operation 502, organization server computer 106 receives a profile of the user. The profile can include user preferences selected by the user, for example via a user interface such as user interface 300. The profile can also include other information regarding the user, such as average walking speeds, running speeds, biking speeds and skating speeds for hybrid trips using the AV.

At operation 504, organization server computer 106 receives information for a specific trip using the AV. The user can provide the trip information via a user interface such as user interface 400.

At operation 506, route processing module 204 uses the profile information received at operation 502 and the trip information received at operation 504 to determine one or more trip routes that can be used to complete the specific trip by the needed arrival time specified in the trip information. Operation 506 is described in more detail with respect to FIG. 6.

At operation 508, organization server computer 106 receives a selection of a trip route by the user.

At operation 510, autonomous vehicle operation module 206 implements the selected trip route using the AV.

Figure 6:
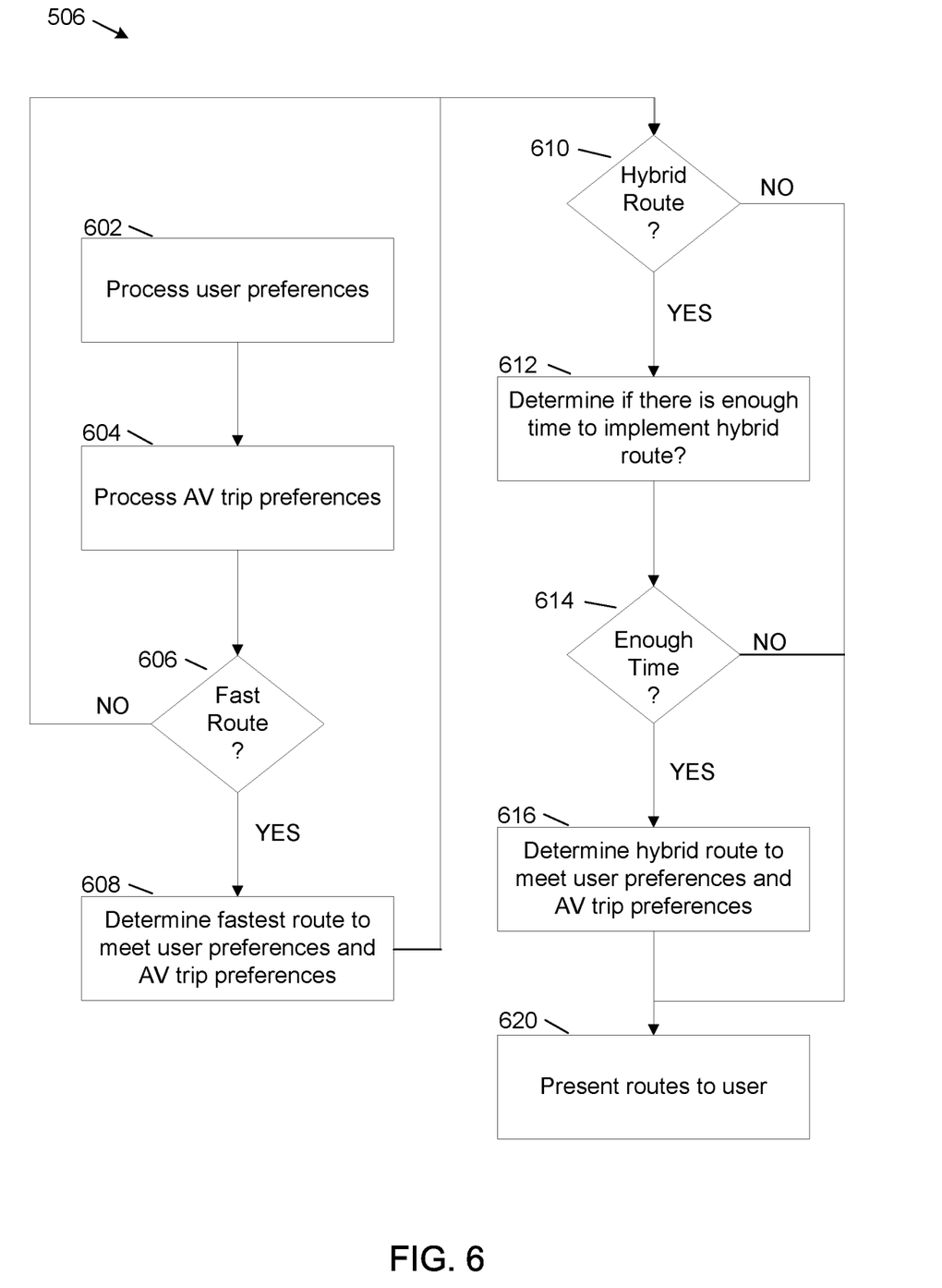
FIG. 6 shows an example method for an operation of FIG. 5.

FIG. 6 shows a flowchart of an example operation 506 of FIG. 5 for determining a route to complete a specific trip with an AV by a needed arrival time.

At operation 602, route processing module 204 processes user preferences received from the user regarding the AV.

At operation 604, route processing module 204 processes preferences received from the user regarding a specific trip using the AV.

At operation 606, route processing module 204 determines whether the user has selected a preference for a fast route.

At operation 606, when a determination is made that the user has selected a preference for a fast route, at operation 608, route processing module 204 identifies the fastest route to meet user preferences and the specific trip preferences using the AV. When satisfying a preference for the fastest route conflicts with other user preferences, route processing module 204 can identify a plurality of routes for the user. In an example implementation, the fastest route can be a route that may be a high stress route, an expensive route that includes tolls and a route through a non-safe area. In the example implementation, a fast route that may not be as fast as the fastest route can be a route that does not include tolls. Other example routes are possible that can still be considered to be fast routes.

For each of the routes identified at operation 606, route processing module 204 can also provide starting times for each route at the preferred starting location specified using user interface 400. Slower routes have earlier starting times to permit the AV to reach the destination by the needed arrival time.

At operation 606, when a determination is made that user has not selected a preference for a fast route, control advances to operation 610. Control also advances to operation 610 from operation 608.

At operation 610, a determination is made as to whether a user has selected a preference for a hybrid route that combines physical activity for the user with a ride using the AV. As shown by the control lines in the flowchart for operation 610, the user can select both the fast route preference and the hybrid route preference, the user can select the fast route preference and not select the hybrid route preference and the user can select the hybrid route preference and not select the fast route preference.

At operation 610, when a determination is made that the user has selected the hybrid route preference, at operation 612, a determination is made as to whether there is enough time to implement the hybrid route preference. Depending on the needed arrival time, the type of physical activity selected for the hybrid route, an average time for the user to complete the physical activity for the hybrid route and arrive at the ending location for the physical activity and other factors, such as current traffic conditions for the AV part of the trip, there may not be enough time for the hybrid route to be implemented. For example, if the needed arrival time is early in the morning and the user would need to start the hybrid route at an earlier time than the user would like, based on the user profile, the route processing module 204 may not be able to implement the hybrid route.

At operation 614, when a determination is made that there is enough time to implement the hybrid route, at operation 616, route processing module 204 determines one or more routes that can include both physical activity for the user and a ride in the AV and meet the parameters specified in the trip request of FIG. 4.

At operation 620, routes created by route processing module are presented to the user. The user can then a select a route that best meets the user's needs. Operation 620 is also implemented after operation 610 when a hybrid route is not selected and after operation 614 when a hybrid route is selected but there is not enough time to implement the hybrid route.

Figure 7:
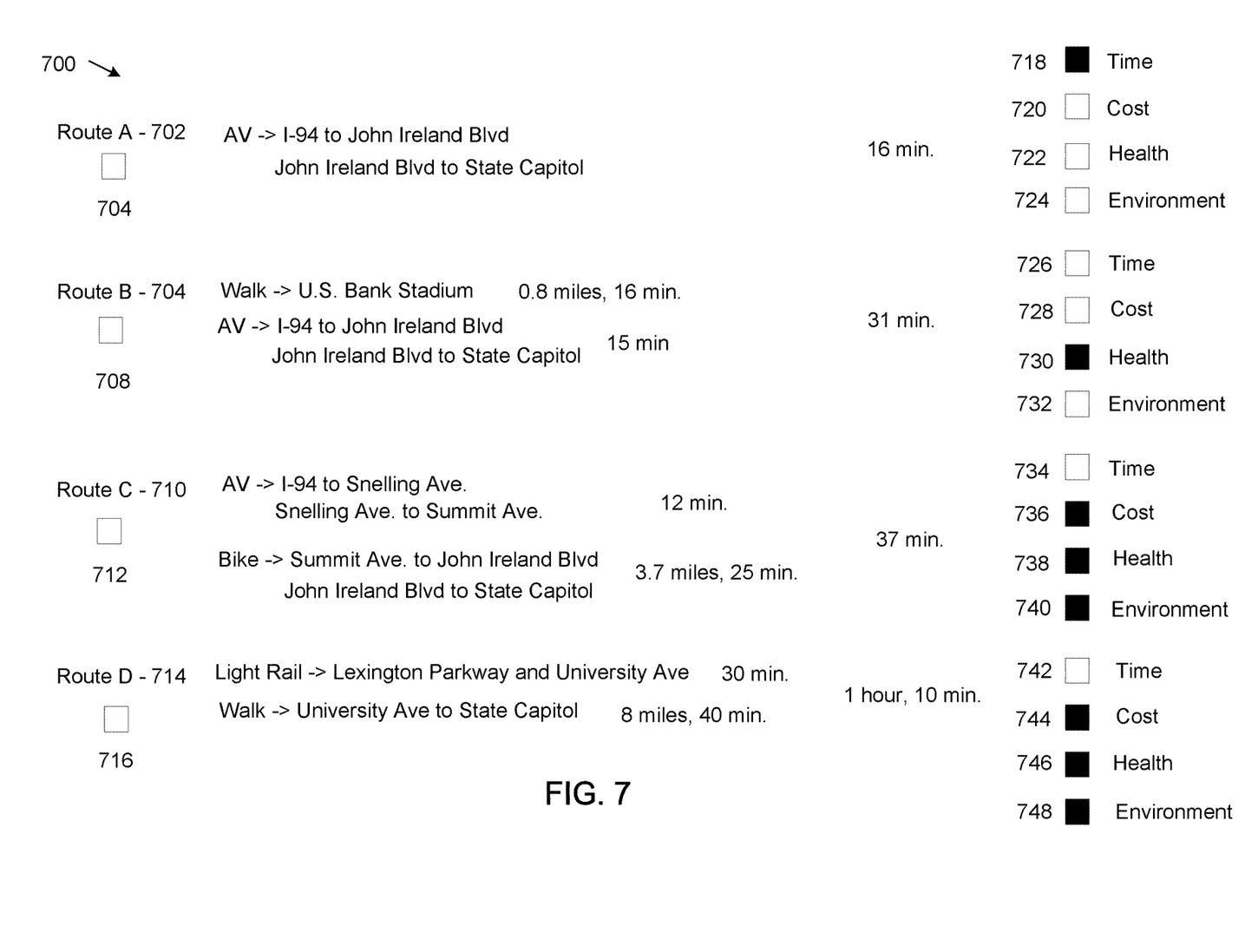
FIG. 7 shows an example user interface that can display alternative trip routes.

FIG. 7 shows an example user interface 700 that can be displayed on customer computing device 102 to show example routes that can be created by route processing module 204. The routes are created based on a user profile, including user preferences 300 and information in a trip request, per user interface 400.

User interface 700 shows four example trip routes, route A 702, route B 706, route C 710 and route D 714. Each trip route includes a description of the route, with trip times for portions of the route and mileage amounts for portions of the routes that include physical activity. A total time for each route is shown. In addition, route indicators are providing showing features of each route with regard to time, cost, health and environment. For user interface 700, a route indicator is shaded to indicate a feature is provided in the route. In other implementations, colors or other markings can be used to indicate selected features. A checkbox is also provided for each route (checkboxes 704, 708, 712 and 716) permitting the user to select one of the routes.

Example route A 702 is a route that uses an AV for the entire route. As shown in FIG. 7, route A takes a total of 16 minutes. Therefore, route A is the fastest of the four routes shown. For route indicators, 718-724, only route indicator 718 is shaded, indicating that route A provides a feature of a fast time.

Example route B 704 is a route that permits the user to walk for a first part of the route and then uses an AV for the remainder of the route. As shown in FIG. 7, the walking portion of the route is for a distance of 0.8 miles and is estimated to take the user 16 minutes to complete, based on the user's average walking speed of 3 miles/hour (per the user's profile). The AV portion of the route takes 15 minutes, so that the total time for the route is 31 minutes. For route indicators 726-732, only route indicator 730 is shaded, indicating that route B provides a feature of a health benefit, because of the physical activity of walking during part of the route.

Example route C 710 is a route that permits the user to bike for a second part of the route after using an AV for the first part of the route. As shown in FIG. 7, the AV portion of the route takes 12 minutes. The biking portion of the route, a distance of 3.7 miles, is estimated to take 25 minutes, based on the user's average biking speed of 9 miles/hour (per the user's profile). The total time for the route is therefore 37 minutes. For route indicators 734-740, route indicators 736, 738 and 740 are checked, indicating a cost benefit, a health benefit and an environment benefit. The cost benefit can occur because the AV is used for a shorter distance than for routes A and B, so that gasoline costs are lower. The health benefit can occur because of the physical activity of biking. The environment benefit can occur because less gasoline is used and therefore less air pollution is created and because the biking part of the route is through a scenic neighborhood.

Example route D 714 is a route that does not use the AV. Instead, a first part of the route uses light rail, and a second part of the route comprises walking. As shown in FIG. 7, the light rail portion of the route takes 30 minutes and the walking portion of the route is estimated to take 40 minutes, for a total time for the route of 1 hour, 10 minutes. For route indicators 742-748, route indicators 744, 746 and 748 are shaded, indicating cost benefits, health benefits and environment benefits for the route.

Figure 8:
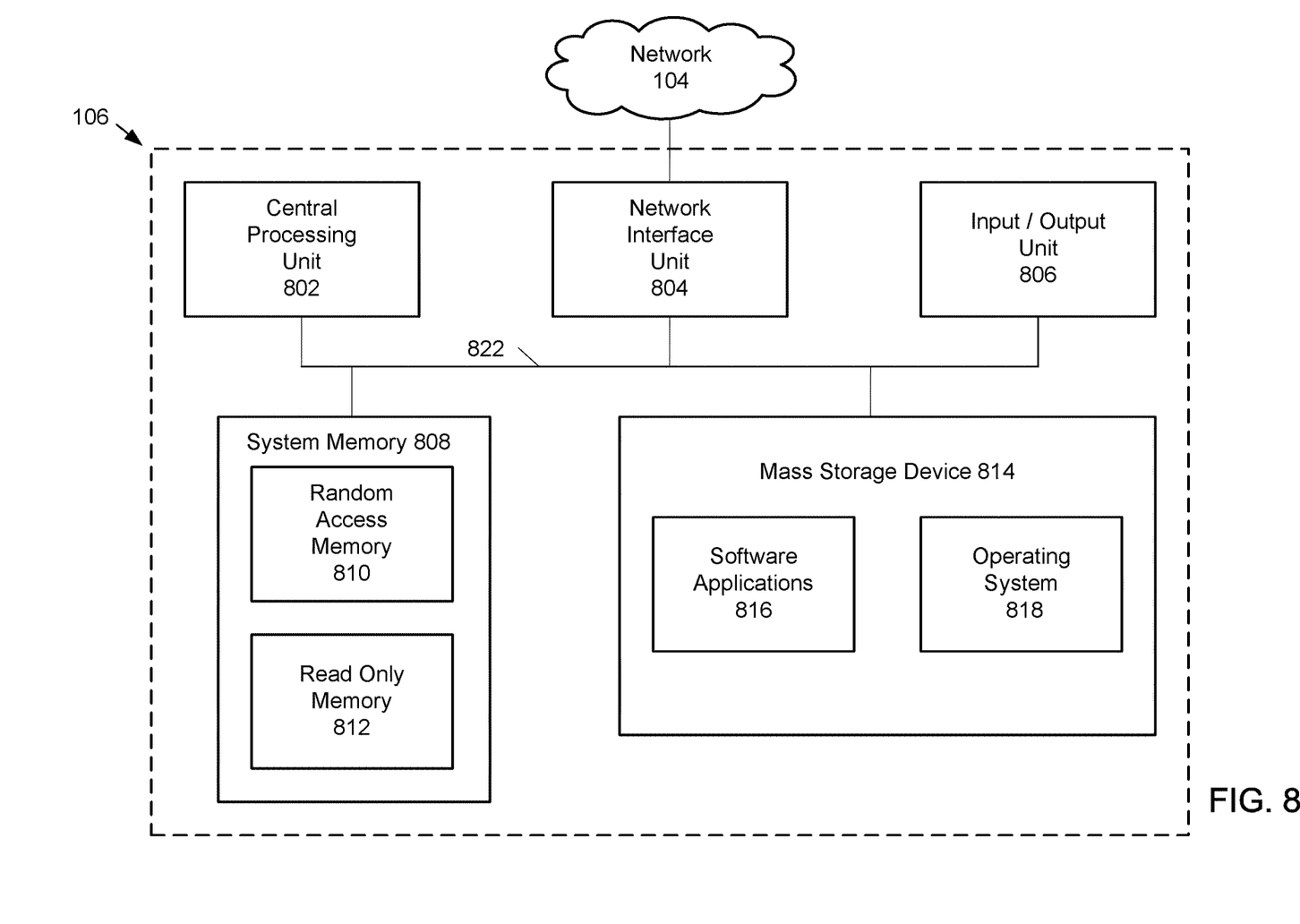
FIG. 8 shows example physical components of the organization server computer of FIG. 1.

As illustrated in the example of FIG. 8, organization server computer 106 includes at least one central processing unit ("CPU") 802, also referred to as a processor, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the organization server computer 106, such as during startup, is stored in the ROM 812. The organization server computer 106 further includes a mass storage device 814. The mass storage device 814 is able to store software instructions and data. Some or all of the components of the organization server computer 106 can also be included in customer computing device 102.

The mass storage device 814 is connected to the CPU 802 through a mass storage controller (not shown) connected to the system bus 822. The mass storage device 814 and its associated computer-readable data storage media provide non-volatile, non-transitory storage for the organization server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the organization server computer 106.

According to various embodiments of the invention, the organization server computer 106 may operate in a networked environment using logical connections to remote network devices through the network 104, such as a wireless network, the Internet, or another type of network. The organization server computer 106 may connect to the network 104 through a network interface unit 804 connected to the system bus 822. It should be appreciated that the network interface unit 804 may also be utilized to connect to other types of networks and remote computing systems. The organization server computer 106 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the organization server computer 106 can store software instructions and data. The software instructions include an operating system 818 suitable for controlling the operation of the organization server computer 106. The mass storage device 814 and/or the RAM 810 also store software instructions and software applications 816, that when executed by the CPU 802, cause the organization server computer 106 to provide the functionality of the organization server computer 106 discussed in this document. For example, the mass storage device 814 and/or the RAM 810 can store software instructions that, when executed by the CPU 802, cause the organization server computer 106 to display received data on the display screen of the organization server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for using an autonomous vehicle, the method comprising:
    on the electronic computing device, receiving one or more user preferences for use of the autonomous vehicle;
    receiving a rank associated with each of the one or more user preferences;
    receiving a destination for a trip using the autonomous vehicle;
    receiving an arrival time for when the trip needs to be completed;
    determining whether the user preferences include a preference for a physical activity for the trip;
    accessing a user's personal schedule to determine one or more activities that a user has scheduled during a time of the trip;
    providing one or more routes for the trip to the destination that permits the trip to be completed by the arrival time, that implements at least one of the user preferences based on the rank, and that permits the user to complete at least one of the one more activities the user has scheduled during the time of the trip, at least one of the routes comprising a hybrid route including one segment in which a selected physical activity is suggested for traversing a distance of the one segment and another segment using the autonomous vehicle, and wherein the one segment including the selected physical activity is selected based upon a crime rate associated with the one segment;
    receiving a user selection of a user selected route from the one or more routes for the trip;
    determining a start time for the user selected route; and
    providing a set of route features associated with the user selected route including a total time to complete the user selected route, a monetary cost measuring a total cost of the user selected route, a total non-monetary cost measuring a social cost and an environmental cost of the user selected route, and a health benefit measuring a physical activity level of the user selected route.

2. The method of claim 1, wherein the hybrid route permits the user to walk, bike or run during part of the trip.

3. The method of claim 1, further comprising:
    determining an average speed for the selected physical activity for the user.

4. The method of claim 3, wherein the average speed is obtained from a profile for the user.

5. The method of claim 3, further comprising using the average speed for the selected physical activity to determine an estimated time to complete the physical activity for the hybrid route.

6. The method of claim 5, further comprising, determining a location to begin a ride using the autonomous vehicle at an end of the selected physical activity for the hybrid route so that the user can reach the destination by the arrival time.

7. The method of claim 1, wherein at least one of the routes provides a fastest time from a starting location to the destination.

8. The method of claim 1, further comprising calculating a cost of the trip, including one or more of gasoline costs, car maintenance costs, and a cost for car insurance.

9. The method of claim 1, wherein the environmental cost includes an effect of the trip on air pollution.

10. The method of claim 1, wherein the health benefit includes whether exercise for the user is built into the trip.

11. The method of claim 1, further comprising using the rank to determine an importance of the one or more user preferences.

12. The method of claim 1, further comprising using the rank to determine which user preference to implement when the one or more user preferences are incompatible with each other.

13. The method of claim 1, further comprising receiving a user profile, and wherein the rank is determined based on the user profile.

14. The method of claim 1, wherein the user preferences are selected from a minimal cost of operating the autonomous vehicle, a combination of physical activity and driving, minimizing stress to the user, a lesser amount of traffic, a scenic route, an environmentally beneficial route, minimizing gasoline, inexpensive parking, carpooling, reduced stress, fastest arrival time, minimizing a cost of a trip, parking close to the destination, minimizing autonomous vehicle emissions, maximizing clear air, combining tasks, obtaining micro-insurance, utilizing good quality roads, and an ability for gamification.

15. The method of claim 1, wherein the monetary costs are selected from a cost of gasoline, tolls, parking, renting the autonomous vehicle, and a projected cost of depreciation for the autonomous vehicle.

* * * * *